United States Patent
Schroeder et al.

(10) Patent No.: US 10,253,637 B2
(45) Date of Patent: Apr. 9, 2019

(54) METHOD AND SYSTEM FOR IMPROVING TURBINE BLADE PERFORMANCE

(71) Applicant: General Electric Company, Schenectady, NY (US)

(72) Inventors: Eric Joseph Schroeder, Loveland, OH (US); Paul Hadley Vitt, Liberty Township, OH (US); Timothy John Swenson, Cincinnati, OH (US); Kirk Douglas Gallier, Liberty Township, OH (US); Aspi Rustom Wadia, Loveland, OH (US)

(73) Assignee: General Electric Company, Schenectady, NY (US)

( * ) Notice: Subject to any disclaimer, the term of this patent is extended or adjusted under 35 U.S.C. 154(b) by 431 days.

(21) Appl. No.: 14/967,069

(22) Filed: Dec. 11, 2015

(65) Prior Publication Data

US 2017/0167275 A1    Jun. 15, 2017

(51) Int. Cl.
*F02C 7/12* (2006.01)
*F01D 5/20* (2006.01)
(Continued)

(52) U.S. Cl.
CPC .............. *F01D 5/20* (2013.01); *F01D 5/141* (2013.01); *F01D 5/145* (2013.01); *F01D 5/147* (2013.01);
(Continued)

(58) Field of Classification Search
CPC .......... F01D 5/141; F01D 5/145; F01D 5/147; F01D 5/187; F01D 5/20; F01D 9/04; F02C 3/06; F02C 7/18; F05D 2220/36; F05D 2230/10; F05D 2240/307; F05D 2240/35; F05D 2260/20; Y02T 50/673; Y02T 50/67
See application file for complete search history.

(56) References Cited

U.S. PATENT DOCUMENTS 5,282,721 A * 2/1994 Kildea ................... F01D 11/10
                                                     415/173.1
5,720,431 A    2/1998 Sellers et al.
(Continued)

FOREIGN PATENT DOCUMENTS

EP          2 599 958 A2    6/2013
WO       2015102828 A1    7/2015

OTHER PUBLICATIONS

Extended European Search Report and Opinion issued in connection with corresponding EP Application No. 16201693.5 dated Mar. 8, 2017.

*Primary Examiner* — Jesse Bogue
(74) *Attorney, Agent, or Firm* — General Electric Company; William Scott Andes

(57) ABSTRACT

A turbine blade is described herein, the turbine blade including a blade root, a blade tip, and an airfoil extending between the blade root and the blade tip. The airfoil has opposite pressure and suction sides extending between a forward leading edge and an aft trailing edge of the airfoil, and a maximum thickness located between the leading edge and the trailing edge. The blade tip includes a winglet extending laterally outward from at least one of the pressure side and the suction side from a leading point between the leading edge and the maximum thickness aftward to a trailing point between the maximum thickness and the trailing edge.

25 Claims, 11 Drawing Sheets

(51) Int. Cl.
  *F01D 5/14*       (2006.01)
  *F01D 9/04*       (2006.01)
  *F02C 3/06*       (2006.01)
  *F02C 7/18*       (2006.01)
  *F01D 5/18*       (2006.01)

(52) U.S. Cl.
  CPC .................. *F01D 9/04* (2013.01); *F02C 3/06* (2013.01); *F02C 7/18* (2013.01); *F01D 5/187* (2013.01); *F05D 2220/36* (2013.01); *F05D 2230/10* (2013.01); *F05D 2240/307* (2013.01); *F05D 2240/35* (2013.01); *F05D 2260/20* (2013.01); *Y02T 50/673* (2013.01); *Y02T 50/676* (2013.01)

(56) References Cited

U.S. PATENT DOCUMENTS

| | | | |
|---|---|---|---|
| 6,142,739 A | 11/2000 | Harvey | |
| 6,672,829 B1 * | 1/2004 | Cherry | F01D 5/141 |
| | | | 415/115 |
| 6,984,107 B2 | 1/2006 | Grunke et al. | |
| 7,118,329 B2 | 10/2006 | Goodman | |
| 7,281,894 B2 * | 10/2007 | Lee | F01D 5/20 |
| | | | 415/173.1 |
| 7,290,986 B2 | 11/2007 | Stegemiller et al. | |
| 7,351,035 B2 * | 4/2008 | Deschamps | F01D 5/20 |
| | | | 416/92 |
| 7,607,893 B2 | 10/2009 | Lee et al. | |
| 7,632,062 B2 | 12/2009 | Harvey et al. | |
| 7,686,578 B2 | 3/2010 | Klasing et al. | |
| 7,972,115 B2 * | 7/2011 | Potier | F01D 5/20 |
| | | | 416/228 |
| 8,092,178 B2 | 1/2012 | Marini et al. | |
| 8,133,032 B2 | 3/2012 | Tibbott et al. | |
| 8,186,965 B2 | 5/2012 | Kuhne et al. | |
| 8,246,307 B2 | 8/2012 | Cheong et al. | |
| 8,425,183 B2 | 4/2013 | Lee et al. | |
| 8,512,003 B2 | 8/2013 | Klasing et al. | |
| 8,632,311 B2 * | 1/2014 | Klasing | F01D 5/20 |
| | | | 415/173.4 |
| 8,777,572 B2 * | 7/2014 | Cheong | F01D 5/20 |
| | | | 415/115 |
| 8,845,280 B2 | 9/2014 | Diamond et al. | |
| 8,894,376 B2 | 11/2014 | Penny et al. | |
| 2008/0044289 A1 * | 2/2008 | Klasing | F01D 5/20 |
| | | | 416/235 |
| 2009/0034422 A1 | 2/2009 | Pasio | |
| 2009/0214355 A1 | 8/2009 | Pereti et al. | |
| 2011/0091327 A1 * | 4/2011 | Willett, Jr. | F01D 5/145 |
| | | | 416/235 |
| 2015/0110617 A1 * | 4/2015 | Stein | F01D 5/141 |
| | | | 415/208.1 |

* cited by examiner

METHOD AND SYSTEM FOR IMPROVING TURBINE BLADE PERFORMANCE

BACKGROUND

The field of the disclosure relates generally to gas turbine engines and, more particularly, methods and systems for improving turbine blade performance with turbine blade winglets.

Many known gas turbine engines have a ducted fan and a core engine arranged in serial flow communication. The fan provides air to the core engine (a "core flow") and to a bypass duct surrounding the core engine (a "bypass flow"). The core engine compresses the core flow and subsequently mixes it with fuel for igniting the mixture to generate a flow of combustion gas through a turbine. The combustion gas drives the turbine within a cylindrical structure known as a "stationary shroud." A gap exists between a tip of rotating blades of the turbine and the stationary shroud. Combustion gas leaks over the blade tips from a pressure side of each blade to a suction side of the blade. This leakage rolls up into a vortex on the suction side, contributing to pressure loss and a reduction in blade loading, which reduces turbine efficiency and performance. The tip vortex may also increase secondary pressure losses associated with an upstream shroud purge flow.

Some systems have attempted to reduce these effects using tip flares or other geometrical features to enhance tip sealing characteristics. However, these attempts generally focus on the pressure side of the blade, which does not address losses from vortex roll-up on the suction side of the blade, and have not successfully inhibited vortex development and associated pressure loss.

BRIEF DESCRIPTION

In one aspect, a turbine blade is provided. The turbine blade includes a blade root, a blade tip, and an airfoil extending between the blade root and the blade tip. The airfoil has opposite pressure and suction sides extending between a forward leading edge and an aft trailing edge of the airfoil, and a maximum thickness located between the leading edge and the trailing edge. The blade tip includes a winglet extending laterally outward from at least one of the pressure side and the suction side from a leading point between the leading edge and the maximum thickness aftward to a trailing point between the maximum thickness and the trailing edge.

In another aspect, a method of improving turbine blade performance is provided. The method includes providing a turbine blade extending radially outward from a blade root, the turbine blade including a blade tip formed at a distal end of the turbine blade and an airfoil extending between the blade root and the blade tip, wherein the airfoil has opposite pressure and suction sides extending between a forward leading edge and an aft trailing edge of the airfoil and a maximum thickness located between the leading edge and the trailing edge. The method also includes providing a winglet coupled to the blade tip, the winglet extending laterally outward from at least one of the pressure side and the suction side from a leading point between the leading edge and the maximum thickness aftward to a trailing point between the maximum thickness and the trailing edge, wherein the winglet is configured to guide a flow of leakage air over the blade tip away from the airfoil. The guiding causes a vortex formed from the leakage air to compact, and reduces a pressure loss across the blade tip through a blade passage defined therearound.

In yet another aspect, a turbofan engine is provided, the turbofan engine including a core engine including a multi-stage compressor and a fan powered by a power turbine driven by gas generated in the core engine. The power turbine includes a turbine blade, the turbine blade including a blade root, a blade tip, and an airfoil extending between the blade root and the blade tip. The airfoil has opposite pressure and suction sides extending between a forward leading edge and an aft trailing edge of the airfoil, and a maximum thickness located between the leading edge and the trailing edge. The blade tip includes a winglet extending laterally outward from at least one of the pressure side and the suction side from a leading point between the leading edge and the maximum thickness aftward to a trailing point between the maximum thickness and the trailing edge.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the turbine blades described herein provide a cost-effective method for improving the performance of a turbine by providing a winglet on the turbine blades. The winglet, in one embodiment, is positioned at a vortex onset point and configured to guide a vortex formed by leakage air away from an airfoil of the turbine blades. The vortex compacts, or rolls up into a more compact core, which reduces pressure losses induced by the vortex. The winglet is configured to begin aft of a leading edge of a blade tip of the turbine blade and terminate forward of a trailing edge of the blade tip, which optimizes the winglet to reduce pressure loss without adding unnecessary weight.

Figure 1:
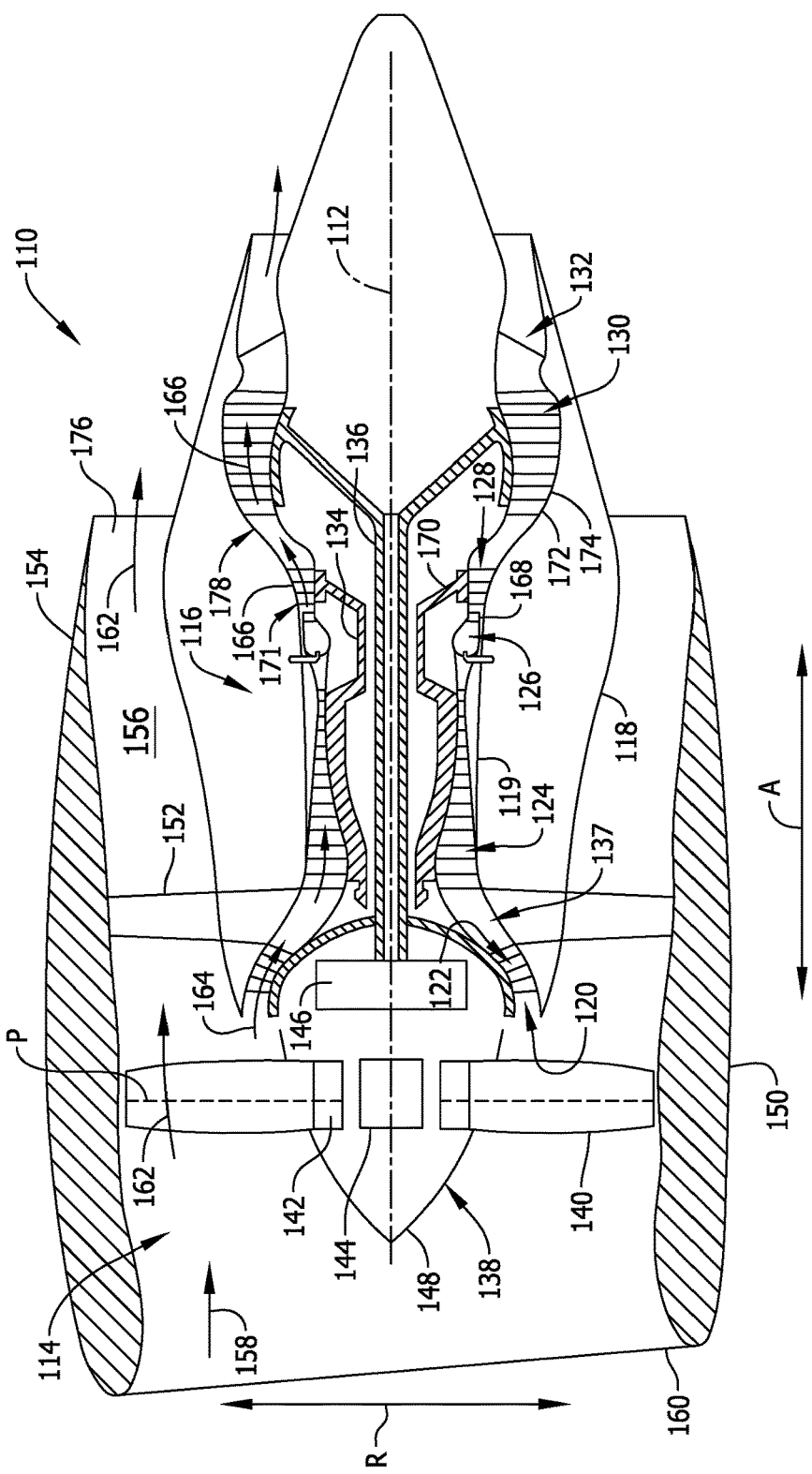
FIG. 1 is a schematic illustration of an exemplary gas turbine engine having a high-pressure turbine including at least one turbine blade in accordance with an example embodiment of the present disclosure.

FIG. 1 is a schematic cross-sectional view of a gas turbine engine 100 in accordance with an exemplary embodiment of the present disclosure. In the example embodiment, gas turbine engine 100 is embodied in a high-bypass turbofan jet engine. As shown in FIG. 1, turbofan engine 100 defines an axial direction A (extending parallel to a longitudinal centerline 112 provided for reference) and a radial direction R. In general, turbofan 100 includes a fan assembly 114 and a core engine 116 disposed downstream from fan assembly 114.

In the example embodiment, core engine 116 includes an approximately tubular outer casing 118 that defines an annular inlet 120. A stationary shroud 119 defines an inner surface or boundary of outer casing 118. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section, combustion section 126, the turbine section, and nozzle section 132 together define a core air flowpath 137.

During operation of turbofan engine 100, a volume of air 158 enters turbofan engine 100 through an associated inlet 160 of fan assembly 114, which includes fan 158. As volume of air 158 passes across a plurality of fan blades 140 of fan 138, a first portion 162 of volume of air 158 is directed or routed into a bypass airflow passage 156 (between core engine 116 and an annular nacelle 150) and a second portion 164 of volume of air 158 is directed or routed into core air flowpath 137, or more specifically into LP compressor 122. A ratio between first portion 162 and second portion 164 is commonly referred to as a bypass ratio. The pressure of second portion 164 is then increased as it is routed through high pressure (HP) compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, which then drives a rotation of HP compressor 124. A gap 171 exists between a tip of blades 170 and stationary shroud 119, which causes a portion of gases 166 to leak thereover. This leakage creates a vortex just downstream of blades 170, which causes pressure loss and reduces the efficiency of HP turbine 128. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, which drives a rotation of LP shaft or spool 136 and LP compressor 122 and/or rotation of fan 138.

Combustion gases 166 are subsequently routed through jet exhaust nozzle section 132 of core engine 116 to provide propulsive thrust. Simultaneously, the pressure of first portion 162 is substantially increased as first portion 162 is routed through bypass airflow passage 156 before it is exhausted from a fan nozzle exhaust section 176 of turbofan engine 100, also providing propulsive thrust. HP turbine 128, LP turbine 130, and jet exhaust nozzle section 132 at least partially define a hot gas path 178 for routing combustion gases 166 through core engine 116.

Turbofan engine 100 is depicted in FIG. 1 by way of example only, and that in other exemplary embodiments, turbofan engine 100 may have any other suitable configuration including for example, a turboprop engine.

Figure 2:
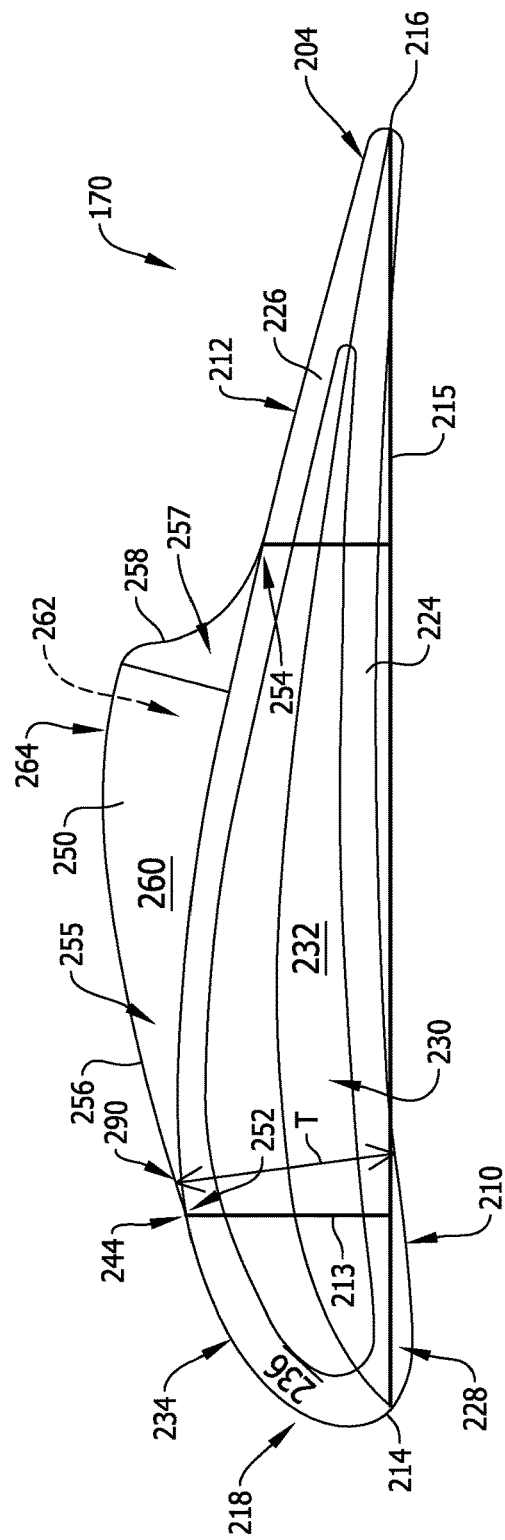
FIG. 2 is a top plan view of a first example embodiment of the turbine blade shown in FIG. 1.
Figure 3:
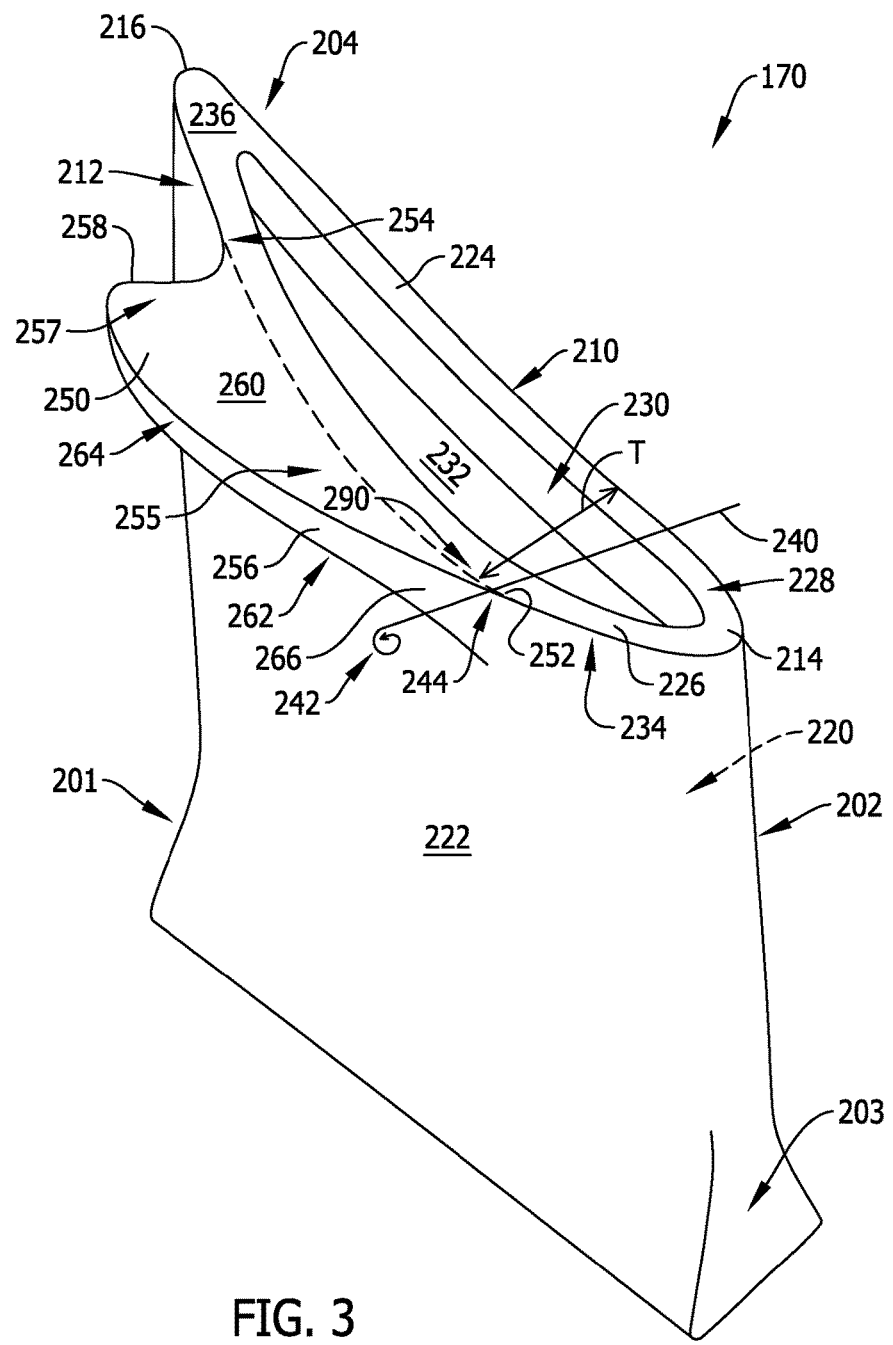
FIG. 3 is a perspective view of the turbine blade shown in FIG. 2.

FIG. 2 is a top plan view of a first example embodiment of HP turbine blade 170, as shown in FIG. 1, and FIG. 3 is a perspective view of turbine blade 170 shown in FIG. 2. It should be understood that although the following discussion is directed to blades 170 of HP turbine 128, the present disclosure is applicable to blades in any turbine, including LP turbine 130, power turbines (not shown), and/or intermediate-pressure turbines (also not shown). Blade 170 extends from a dovetail 201 configured to engage a rotor disk (not shown) of turbine 128. A blade root 203 of blade 170 is coupled to and formed radially outwardly from dovetail 201. Blade 170 further includes an airfoil 202 and a tip 204 at a distal radial end thereof, opposite blade root 203. In the example embodiment, tip 204 includes a squealer tip. Blade 170 includes a pressure side 210 and a circumferentially opposite suction side 212, which extend axially in chord 215 between a leading edge 214 and an opposite trailing edge 216. Pressure side 210 is generally concave and includes a first airfoil side wall 220, and suction side 212 is generally convex complementarily to pressure side 210 and includes a second airfoil side wall 222. Tip 204 includes a first squealer tip rib 224 that conforms to first side wall 220 and a second squealer tip rib 226 that conforms to second side wall 222. First and second tip ribs 224, 226 define a substantially continuous tip rail 228. In addition, first and second tip ribs 224, 226 are spaced apart from one another and define therebetween a tip cavity 230 that includes a tip floor 232 spanning between first and second airfoil side walls 220, 222 and enclosing the radial end of blade 170. In alternative embodiments, tip 204 may not include tip ribs 224, 226 nor tip cavity 230; in other words, tip 204 may be flat or planar.

Tip 204 further includes a winglet 250. In the illustrated embodiment, winglet 250 extends in chord along and circumferentially from suction side 212 of blade 170. More specifically, in the illustrated embodiment, winglet 250 is integrally formed with and extends circumferentially from tip rail 228. In an alternative embodiment, winglet 250 may be other than integrally formed with tip rail 228. For example, winglet 250 may be fabricating in a casting, molding, forging, or other manufacturing process and may be coupled to tip 204 in an additive process. Winglet 250 may be fabricated from the same material as one or more other components of blade 170 (e.g., airfoil 202 and/or tip 204). Alternatively, winglet 250 may be fabricated from a different material from one or more other components of blade 170.

In the example embodiment, winglet 250 extends from a leading point 252 to a trailing point 254. As described above, gap 171 (shown in FIG. 1) is defined between blade tip 204 and stationary shroud 119. Gas 240 leaks from pressure side 210 of blade 170 to suction side 212 of blade 170 and forms a vortex 242. Winglet 250 is configured to change the local flow of gas 240, guiding vortex 242 circumferentially away from airfoil 202. Vortex 242 thereby has a more compact, "tightly rolled" core, which reduces pressure loss across blade tip 204 due to vortex 242, improving turbine 128 efficiency and performance.

In the illustrated embodiment, leading point 252 of winglet 250 is positioned at a distance away from (i.e., aft from) leading edge 214 of tip 204. More particularly, in the illustrated embodiment, leading point 252 is positioned at a vortex onset point 244. In other words, winglet 250 is configured to start at the same point 244 at which vortex 242 initiates. The amount of tip leakage across blade tip 204 is a balance between a relative momentum of nearly stationary fluid (not specifically shown) near stationary shroud 119 and a pressure differential between pressure side 210 and suction side 212 of airfoil 202 ("cross-tip pressure gradient"). The cross-tip pressure gradient is approximately normal to a camber 213 of blade tip 204. In a forward section 218 of tip 204, the effective relative momentum of the near-shroud fluid is greater than the cross-tip pressure gradient. The fluid near stationary shroud 119 presents a high-momentum jet on blade tip 204, acting perpendicular to axis 112 due to the rotation of blade 170. Further aft on blade 170, the lift of tip 204 overcomes this jet. Accordingly, in one embodiment, leading point 252 of winglet 250 is located where a vector sum of the cross-tip pressure gradient becomes greater than the relative momentum of the near-shroud fluid flow (i.e., at vortex onset point 244). It should be understood that the location of vortex onset point 244 may vary from one embodiment of blade 170 to another, and, accordingly, the position of leading point 252 may similarly vary. Moreover, in some cases, the location of vortex onset point 244 is determined using various analytics processes, such as computation fluid dynamics (CFD) analysis.

Distancing leading point 252 from leading edge 214 of tip 204 facilitates reducing any extraneous material of winglet 250 between leading point 252 and leading edge 214, thereby minimizing an added weight of winglet 250 to blade 170. In other embodiments, leading point 252 of winglet 250 is adjacent leading edge 214 or between leading edge 214 and vortex onset point 244 (i.e., forward of vortex onset point 244). In still other embodiments, leading point 252 of winglet 250 is positioned aft of vortex onset point 244; however, this may reduce the efficacy of winglet 250 in reducing pressure loss due to vortex 242.

Leading point 252 at least partially defines a first boundary between a forward first portion 255, including a forward edge 256, of winglet 250 and an outer surface 234 of second tip rib 226. In the example embodiment, forward edge 256 includes a convex curve that is blended or substantially continuous with outer surface 234 of second tip rib 226. Forward edge 256 may extend tangentially from leading point 252, as a straight line from leading point 252, as a curve from leading point 252, and/or with any other suitable configuration such that winglet 250 functions as described herein. In some embodiments, forward edge 256 may be other than substantially continuous with outer surface 234 of second tip rib 226. For example, forward edge 256 may extend from leading point 252 at a corner or sharp intersection with outer surface 234 of second tip rib 226.

In the illustrated embodiment, trailing point 254 of winglet 250 is positioned a distance from (i.e., forward of) trailing edge 216 of tip 204. Distancing trailing point 254 from trailing edge 216 of tip 204 facilitates reducing any extraneous material of winglet 250 between trailing point 254 and trailing edge 216, thereby minimizing an added weight of winglet 250 to blade 170. In other embodiments, trailing point 254 of winglet 250 may be positioned at any distance from trailing edge 216 such that winglet 250 functions as described herein. Alternatively, trailing point 254 of winglet 250 may be positioned adjacent trailing edge 216.

Trailing point 254 at least partially defines a second boundary between an aft second portion 257, including an aft edge 258, of winglet 250 and outer surface 234 of second tip rib 226. In the example embodiment, aft edge 258 includes a concave curve that is blended or substantially continuous with outer surface 234 of second tip rib 226. Aft edge 258 extends in a contour from outer surface 234 of second tip rib 226. Aft edge 258 may extend tangentially from trailing point 254, as a straight line from trailing point 254, as a curve or contour from trailing point 254, and/or with any other suitable configuration such that winglet 250 functions as described herein. In some embodiments, aft edge 258 may be other than substantially continuous with outer surface 234 of second tip rib 226. For example, aft edge 258 may extend abruptly from trailing point 254, such as at a corner or sharp intersection with outer surface 234 of second tip rib 226.

Winglet 250 further includes a winglet top face 260, a winglet bottom face 262, and a winglet outer edge or side face 264 extending therebetween. In the illustrated embodiment, winglet top face 260 is substantially continuous with a top face 236 of tip rail 228. Additionally, winglet top face 260 is annular and concentric with shroud 119 (shown in FIG. 1). Winglet bottom face 262 includes one or more fillets 266 configured to improve the structural strength of winglet 250. In other embodiments, winglet bottom face 262 may include no fillets 266. For example, winglet bottom face 262 may be substantially planar and/or complementary to winglet top face 260. Winglet side face 264 includes forward edge 256 and aft edge 258. Winglet side face 264 may have any size, shape, and/or configuration such that winglet 250 functions as described herein. In the illustrated embodiment, winglet side face 264 includes a complex curve between and including forward edge 256 and aft edge 258. Moreover, winglet side face 264 is configured such that winglet 250 extends from tip 204 at least about a location of maximum blade thickness T (or "high camber"). In other words, winglet 250 is positioned such that leading point 252 is between leading edge 214 and a suction-side point 290 corresponding to thickness T, and trailing point 254 is between suction-side point 290 corresponding to thickness T and trailing edge 216. In alternative embodiments, leading point 252 is positioned between suction-side point 290 corresponding to thickness T and trailing edge 216.

In other embodiments, winglet side face 264 may include any combination of curves and/or straight lines. In addition, winglet side face 264 may extend at any angle and/or with any configuration (e.g., curved, angled, straight) between winglet top face 260 and winglet bottom face 262. Additionally or alternatively, in some embodiments, one or more of winglet top face 260, winglet bottom face 262, and winglet side face 264 may be alternatively configured such that winglet 250 includes additional features, such as droops, divots, ridges, additional (radial) curvature, peaks, valleys, and/or any combination thereof.

Moreover, in some embodiments, winglet top face 260 may not be substantially continuous with tip rail top face 236 and/or may not be concentric with shroud 119. For example, in some embodiments, winglet 250 may be radially offset outwardly such that winglet top face 260 extends above tip rail top face 236. Such an outward radial offset is limited by an amount of tip clearance between tip 204 and shroud 119. In other embodiments, winglet 250 may be radially offset inwardly such that winglet top face 260 extends below tip rail top face 236. In still other embodiments, winglet top face 260 may not be offset from tip rail top face 236 but may extend (e.g., in a curve and/or in a plane) radially inward or radially outward therefrom in the circumferential direction away from tip rail 228.

Additionally or alternatively, as described further herein, winglet 250 may include or be integrated with other features of tip 204. For example, winglet 250 may be integrated with one or more of a pressure-side flare feature, a tip baffle feature, and/or any other feature of tip 204.

It should be recognized that winglet 250 may be implemented on varying embodiments of blades 170 (e.g., small or large, future or existing, aircraft or non-aircraft turbines), according to the teachings herein. Notably, winglet 250 may be implemented on blade tip 204 without substantial weight or cost increase, with a plurality of benefits and advantages. Winglet 250 is configured to reduce scrubbing drag imposed by vortex 242. Accordingly, by introducing winglet 250, as substantially shown and described, to blade 170, blade 170 experiences reduced pressure loss, which results in increased work done by turbine 128 and higher efficiency of turbine 128 (e.g., about an 0.10-point increase in turbine efficiency). Accordingly, specific fuel consumption by engine 100 may be decreased (e.g., by about 0.05-0.10%). Moreover, as pressure loss is reduced, an improvement in downstream air pressure is also realized. In particular, including winglet 250 on blade tip 204 may improve flow into a turbine center frame (TCF, not shown) of turbine 128, resulting in reduced pressure losses in the TCF.

Figure 4:
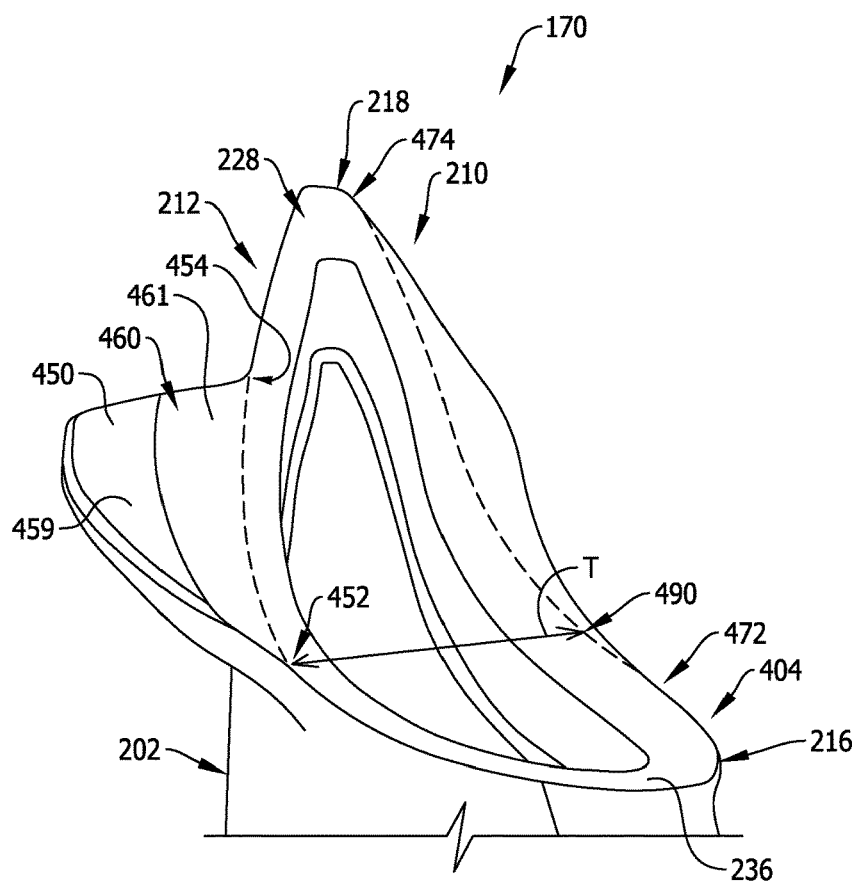
FIG. 4 is a perspective view of one turbine blade as shown in FIGS. 1-3 including a first alternative blade tip.
Figure 5:
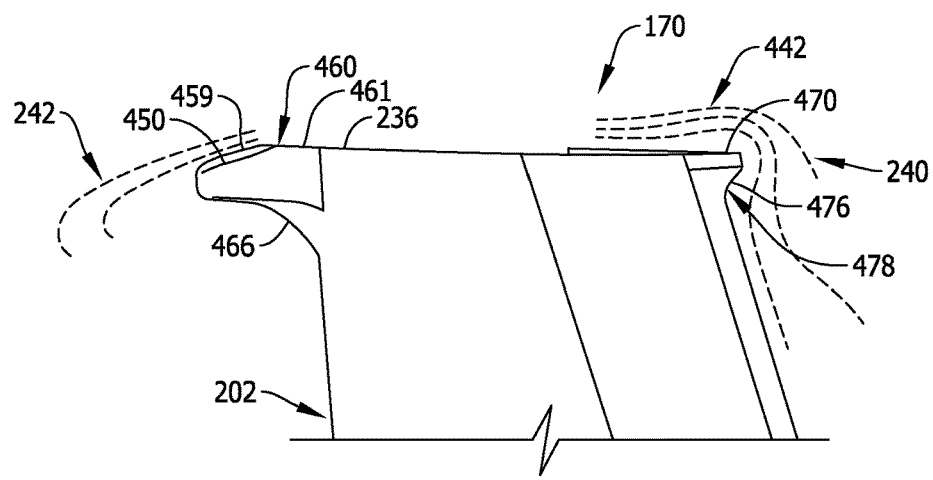
FIG. 5 is a first side view of the turbine blade shown in FIG. 4 including the first alternative blade tip blade tip.
Figure 6:
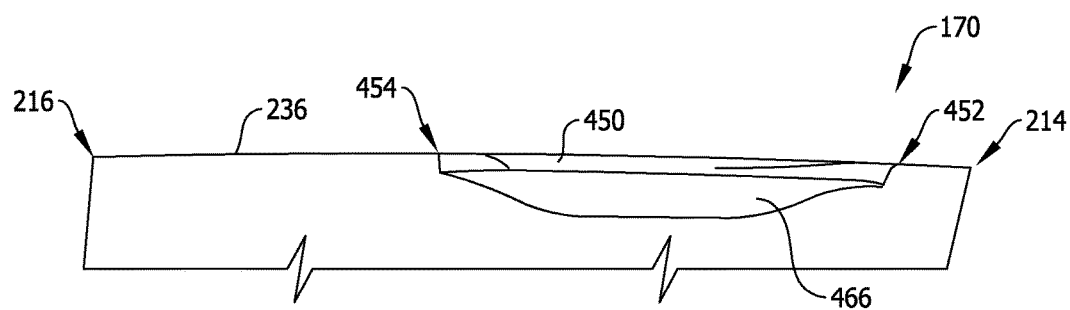
FIG. 6 is a second side view of the turbine blade shown in FIGS. 4 and 5 including the first alternative blade tip blade tip.

FIG. 4 is a perspective view of one turbine blade 170 (shown in FIGS. 1-3) including a first alternative blade tip 404, FIG. 5 is a first side view of turbine blade 170 including blade tip 404, and FIG. 6 is a second side view of turbine blade 170 including blade tip 404. Where components shown in FIG. 4-6 are the same or functionally similar to components shown in FIGS. 2 and 3, the same reference numerals are employed. In the illustrated embodiment, blade 170 includes airfoil 202 and a tip 404. Tip 404 includes a first winglet 450, which may be similar to winglet 250, shown in FIGS. 2 and 3, and a second winglet 470. First winglet 450 extends in chord along and circumferentially from suction side 212 of blade 170. Second winglet 470 extends in chord along and circumferentially from pressure side 210 of blade 170. More specifically, in the illustrated embodiment, second winglet 470 is integrally formed with and extends circumferentially from tip rail 228. In an alternative embodiment, second winglet 470 may be other than integrally formed with tip rail 228. First winglet 450 extends from a leading point 452 (referred to herein as "first leading point" 452) to a trailing point 454 (referred to herein as "first trailing point" 454). Second winglet 470 also extends from a leading point 472 (referred to herein as "second leading point" 472) to a trailing point 474 (referred to herein as "second trailing point" 474).

In the illustrated embodiment, second leading point 472 is positioned aft of leading edge 214, and second trailing point 474 is positioned forward of trailing edge 216. In alternative embodiments, second winglet 470 is formed continuously with first winglet 450, such that first leading point 452 and second leading point 472 meet at leading edge 214 and/or first trailing point 454 and second trailing point 474 meet at trailing edge 216. Second winglet is positioned such that second leading point 472 is between leading edge 214 and a pressure-side point 490 corresponding to maximum blade thickness T, and second trailing point 474 is between pressure-side point 490 corresponding to maximum blade thickness T and trailing edge 216. Second winglet 470 may have one or more features similar to first winglet 450 and/or winglet 250 described with respect to FIGS. 2 and 3. For example, second winglet 470 may include a bottom fillet 476 similar to bottom fillet 266 of winglet 250 and/or a bottom fillet 466 of first winglet 450. As shown in FIG. 5, second (pressure-side) winglet 470 is configured as a "flow discourager" as it increases a vena-contracta (or venturi) effect that increases a boundary layer 442 of air, which in turn decreases a discharge coefficient (or flow) of leakage air 240. In other words, second winglet 470 makes it more difficult for leakage air 240 to enter gap 171. Accordingly, second winglet 470 facilitates weakening the induced vortex roll-up 242. Moreover, increasing a surface area of tip 204, by providing first and second winglets 450, 470, facilitates thickening of boundary layer 442. In one embodiment, a winglet bottom face 478 of second winglet 470 may have an increased surface roughness compared to the rest of (or at least a portion of) blade 170, as such surface roughness facilitates increasing turbulence induced across winglet bottom face 478. In turn, boundary layer 442 may be increased. In another alternative embodiment, tip 404 may only include second (pressure-side) winglet 470.

In addition, in the illustrated embodiment, first winglet 450 includes winglet top face 460. In the illustrated embodiment, winglet top face 460 includes a first region 459 and a second region 461. Second region 461 is substantially co-planar with tip rail top face 236, and first region 459 is chamfered or angled radially inward from second region 461.

Figure 7:
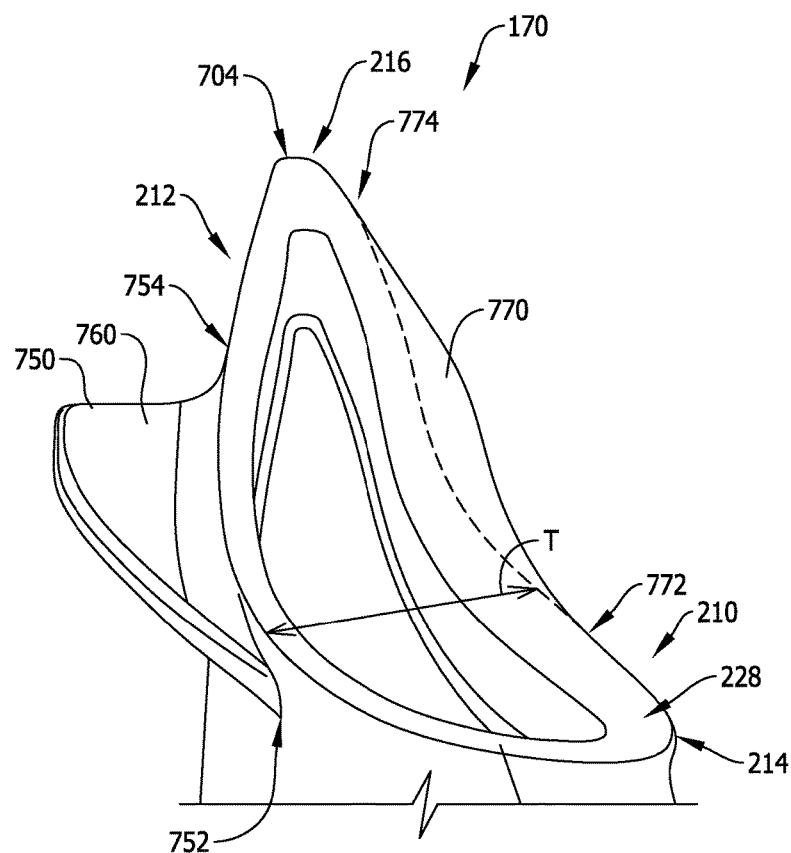
FIG. 7 is a perspective view of one turbine blade as shown in FIGS. 1-6 including a second alternative blade tip.
Figure 8:
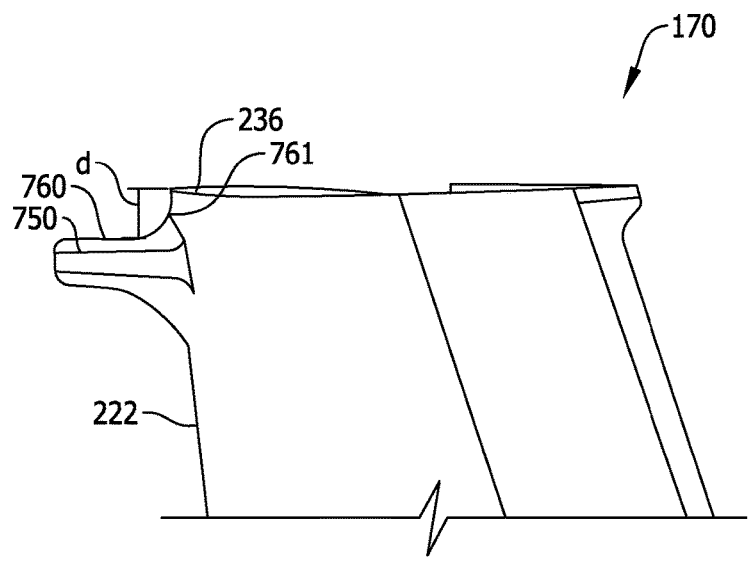
FIG. 8 is a first side view of the turbine blade shown in FIG. 7 including the second alternative blade tip.
Figure 9:
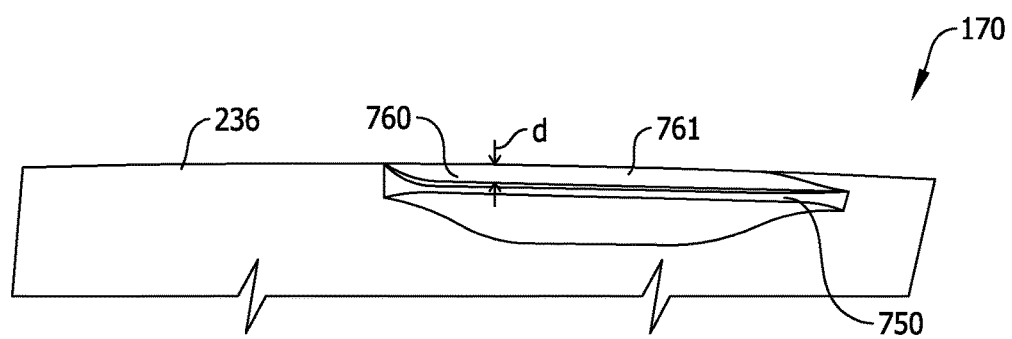
FIG. 9 is a second side view of the turbine blade shown in FIGS. 7 and 8 including the second alternative blade tip.

FIG. 7 is a perspective view of a turbine blade 170 (shown in FIGS. 1-6) including a second alternative blade tip 704, FIG. 8 is a first side view of turbine blade 170 including blade tip 704, and FIG. 9 is a second side view of turbine blade 170 including blade tip 704. Where components shown in FIGS. 7-9 are the same or functionally similar to components shown in FIGS. 2 and 3 and/or FIGS. 4-6, the same reference numerals are employed. In the illustrated embodiment, blade 170 includes airfoil 202 and a tip 704. Tip 704 includes a first winglet 750, which may be similar to winglet 250 (shown in FIGS. 2 and 3) and/or winglet 450 (shown in FIGS. 4-6). Tip 704 further includes a second winglet 770, which may be similar to second winglet 470 (also shown in FIGS. 4-6). First winglet 750 extends in chord along and circumferentially from suction side 212 of blade 170. Second winglet 770 extends in chord along and circumferentially from pressure side 210 of blade 170. More specifically, in the illustrated embodiment, second winglet 770 is integrally formed with and extends circumferentially from tip rail 228. In an alternative embodiment, second winglet 770 may be other than integrally formed with tip rail 228.

First winglet 750 extends from a leading point 752 (referred to herein as "first leading point" 752) to a trailing point 754 (referred to herein as "first trailing point" 754). Second winglet 770 also extends from a leading point 772 (referred to herein as "second leading point" 772) to a trailing point 774 (referred to herein as "second trailing point" 774). In the illustrated embodiment, second leading point 772 is positioned aft of leading edge 214, and second trailing point 774 is positioned forward of trailing edge 216. Second winglet 770 may have one or more features similar to one or more of winglets 250, 450, 470, and/or 750. In another alternative embodiment, tip 704 may only include second (pressure-side) winglet 770.

In addition, in the illustrated embodiment, first winglet 750 includes winglet top face 760. In the illustrated embodiment, winglet top face 760 is spaced from tip rail top face 236 by a predetermined distance d. Distance d may be determined based on one or more characteristics of blade 170 and/or tip 704. In the illustrated embodiment, winglet top face 760 includes a continuity region 761 configured to blend first winglet 750 continuously with tip 704. In an alternative embodiment, winglet top face 760 does not include continuity region 761, such that winglet 750 extends abruptly from second side wall 222 at distance d from tip rail top face 236.

Figure 10:
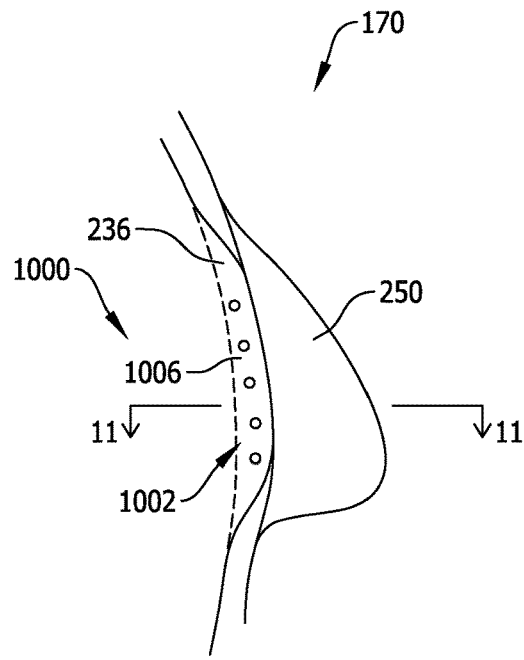
FIG. 10 is a top plan view of the turbine blade shown in FIGS. 1-9 including a first example embodiment of a cooling aperture arrangement.
Figure 11:
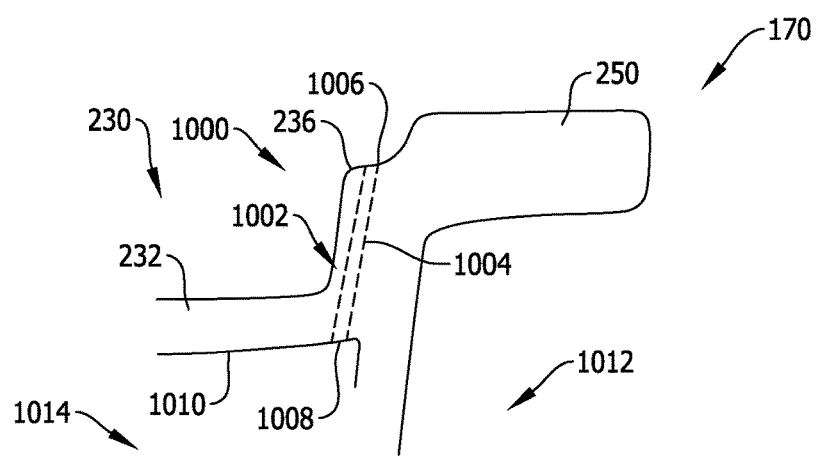
FIG. 11 is a side view of the turbine blade including the cooling aperture arrangement shown in FIG. 10.

FIGS. 10 and 11 illustrate a first example embodiment of a cooling aperture arrangement 1000 that may be implemented with blade 170 (shown in FIGS. 1-9). More specifically, FIG. 10 is a top plan view of blade 170 including cooling aperture arrangement 1000, and FIG. 11 is a side view of blade 170 including cooling aperture arrangement 1000. Cooling aperture arrangement may be implemented with blade 170 to provide cooling (e.g., cooling air drawn from a blade internal cooling circuit, not shown) to winglet 250 (shown in FIGS. 2 and 3), to first and/or second winglet(s) 450, 470 (shown in FIGS. 4-6), and/or to first and/or second winglet(s) 750, 770 (shown in FIGS. 7-9). In the illustrated embodiment, cooling aperture arrangement 1000 includes one or more apertures 1002. Each aperture 1002 defines a cooling channel 1004 between a first end 1006 and a second end 1008. First end 1006 is defined in tip rail top face 236, and second end 1008 is defined in an inner surface 1010 of tip floor 232 opposite tip cavity 230. Accordingly, cooling channel 1004 extends between an exterior 1012 of blade 170 and an interior 1014 of blade 170.

Figure 12:
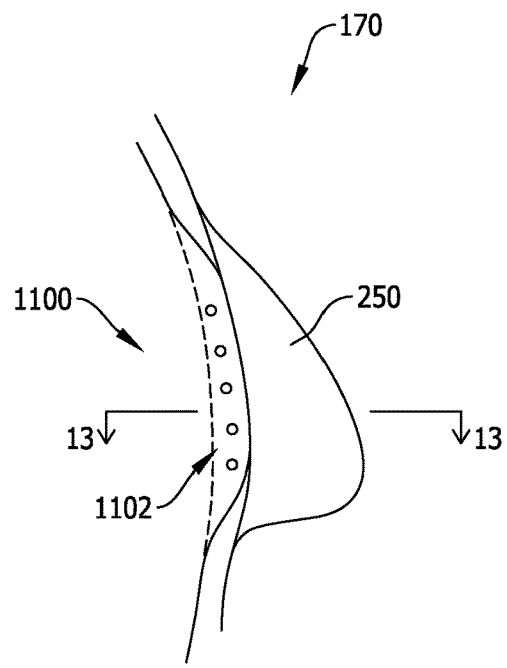
FIG. 12 is a top plan view of the turbine blade shown in FIGS. 1-9 including a second example embodiment of a cooling aperture arrangement.
Figure 13:
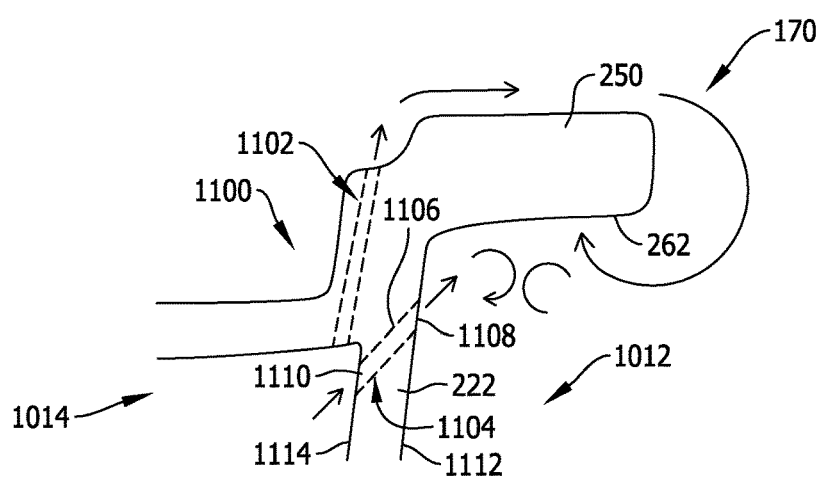
FIG. 13 is a side view of the turbine blade including the cooling aperture arrangement shown in FIG. 12.

FIGS. 12 and 13 illustrate a second example embodiment of a cooling aperture arrangement 1100 that may be implemented with blade 170 (shown in FIGS. 1-9). More specifically, FIG. 12 is a top plan view of blade 170 including cooling aperture arrangement 1100, and FIG. 13 is a side view of blade 170 including cooling aperture arrangement 1100. In the illustrated embodiment, cooling aperture arrangement 1100 includes one or more first apertures 1102 and one or more second apertures 1104. Each first aperture 1102 may be substantially similar to apertures 1002 (shown in FIGS. 10 and 11). Each second aperture 1104 defines a cooling channel 1106 between a first end 1108 and a second end 1110. First end 1108 is defined in an outer surface 1112 of second side wall 222, proximate to winglet bottom face 262. Second end 1110 is defined in an inner surface 1114 of second side wall 222 opposite outer surface 1112. Accordingly, cooling channel 1106 also extends between exterior 1012 and interior 1014 of blade 170. Second aperture(s) 1104 are configured to provide additional or supplemental cooling to winglet 250.

Figure 14:
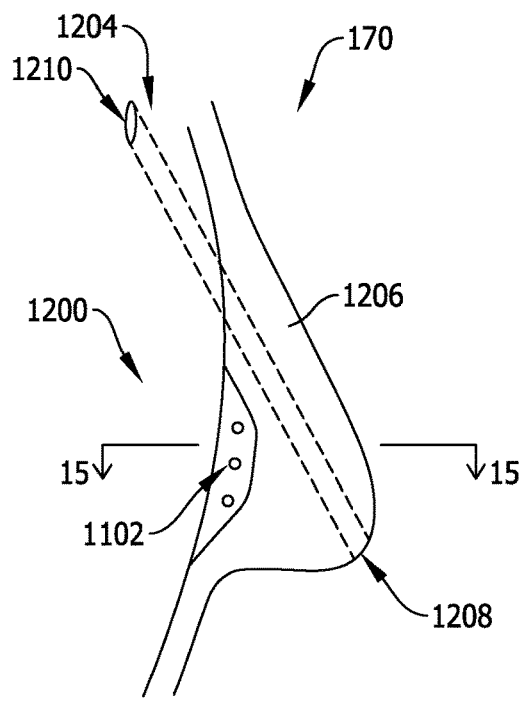
FIG. 14 is a top plan view of the turbine blade shown in FIGS. 1-9 including a third example embodiment of a cooling aperture arrangement.
Figure 15:
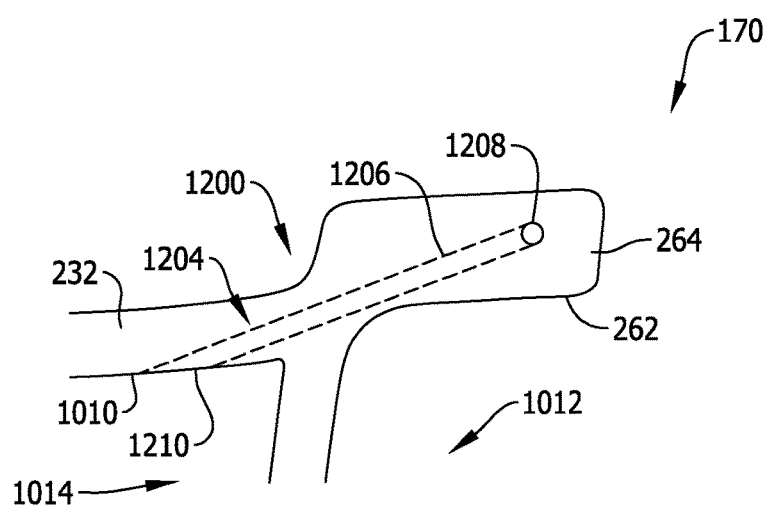
FIG. 15 is a side view of the turbine blade including the cooling aperture arrangement shown in FIG. 14.

FIGS. 14 and 15 illustrate a third example embodiment of a cooling aperture arrangement 1200 that may be implemented with blade 170 (shown in FIGS. 1-9). More specifically, FIG. 13 is a top plan view of blade 170 including cooling aperture arrangement 1200, and FIG. 14 is a side view of blade 170 including cooling aperture arrangement 1200. In the illustrated embodiment, cooling aperture arrangement 1200 includes one or more first apertures 1202 and one or more second apertures 1204. Each first aperture 1202 may be substantially similar to apertures 1002 (shown in FIGS. 10 and 11). Each second aperture 1204 defines a cooling channel 1206 between a first end 1208 and a second end 1210. First end 1208 is defined in winglet side face 264 (or, an in alternative embodiment, winglet bottom face 262), and second end 1210 is defined in inner surface 1010 of tip floor 232. Accordingly, cooling channel 1206 also extends between exterior 1012 and interior 1014 of blade 170, more specifically, through at least a portion of winglet 250. It should be understood that alternative cooling aperture arrangements that those shown herein may be included on blade 170 to cool winglet 250. Cooling aperture arrangements may be positioned on pressure side 210, suction side 212, and/or tip 204 of blade 170. Apertures therein may be positioned upstream of, adjacent to, and/or through winglet 250 and/or airfoil 202 of blade 170.

Figure 16:
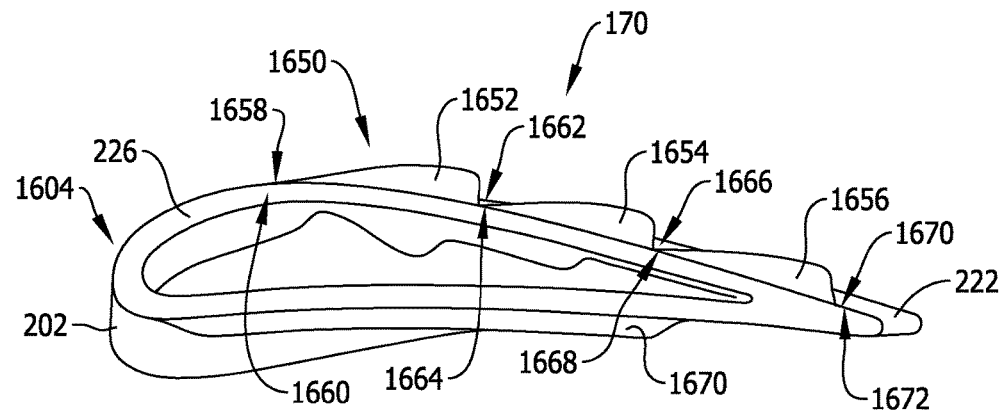
FIG. 16 is a perspective view of a turbine blade one turbine blade as shown in FIGS. 1-15 including a third alternative blade tip.

FIG. 16 is a perspective view of a turbine blade 170 (shown in FIGS. 1-15) including a third alternative blade tip 1604. Where components shown in FIG. 16 are the same or functionally similar to components shown in FIGS. 2 and 3 and/or FIGS. 4-9, the same reference numerals are employed. In the illustrated embodiment, blade 170 includes airfoil 202 and a tip 1604. Tip 1604 includes a first winglet 1650, which may be similar to winglet 250 (shown in FIGS. 2 and 3), winglet 450 (shown in FIGS. 4-6), and/or winglet 750 (shown in FIGS. 7-9). Tip 1604 further includes a second winglet 1670, which may be similar to second winglet 470 (shown in FIGS. 4-6) and/or second winglet 770 (shown in FIGS. 7-9).

First winglet 1650, in the illustrated embodiment, includes a plurality of "sub-winglets" 1652, 1654, and 1656. First sub-winglet 1652 extends between a leading point 1660, which corresponds to or is co-located with a leading point 1658 of first winglet 1650, to a trailing point 1662. Second sub-winglet 1654 extends from a leading point 1664 to a trailing point 1666, and third sub-winglet 1656 extends from a leading point 1668 to a trailing point 1670, which corresponds to or is co-located with a trailing point 1672 of first winglet 1650. In one embodiment, trailing point 1662 of first sub-winglet 1652 corresponds to or is co-located with leading point 1664 of second sub-winglet 1654, and/or trailing point 1666 of second sub-winglet 1654 corresponds to or is co-located with leading point 1668 of third sub-winglet 1656. In another embodiment, trailing point 1662 of first sub-winglet 1652 is spaced from leading point 1664 of second sub-winglet 1654, and/or trailing point 1666 of second sub-winglet 1654 is spaced from leading point 1668 of third sub-winglet 1656. Moreover, in one embodiment, leading point(s) 1664, 1668 and/or trailing point(s) 1662, 1666 are directly adjacent second tip rib 226, such that one or more of sub-winglets 1652, 1654, and/or 1656 defines a discrete sub-winglet extending from second airfoil side wall 222. In another embodiment, leading point(s) 1664, 1668 and/or trailing point(s) 1662, 1666 are positioned axially outward from second tip rib 226, such that one or more of sub-winglets 1652, 1654, and/or 1656 is continuous with the other(s) of sub-winglets 1652, 1654, and/or 1656.

Figure 17:
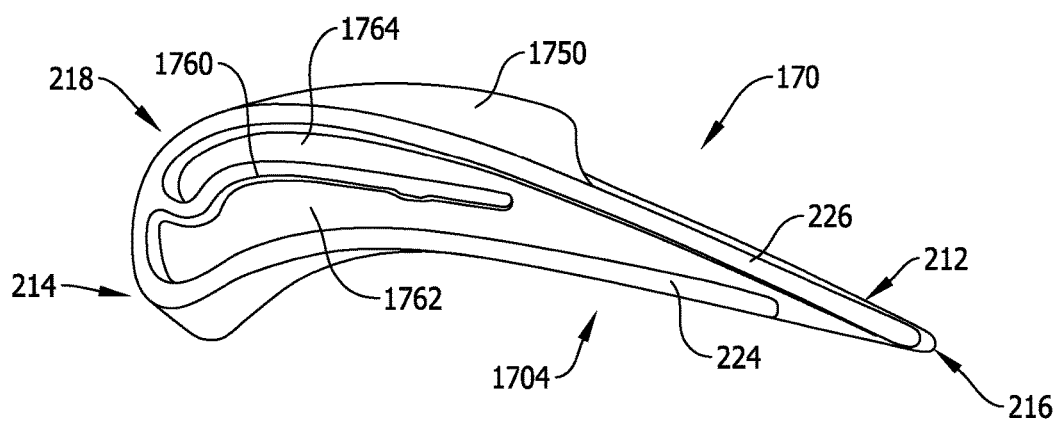
FIG. 17 is a perspective view of a turbine blade one turbine blade as shown in FIGS. 1-16 including a fourth alternative blade tip.

FIG. 17 is a perspective view of a turbine blade 170 (shown in FIGS. 1-16) including a fourth alternative blade tip 1704. Where components shown in FIG. 17 are the same or functionally similar to components shown in FIGS. 2 and 3 and/or FIGS. 4-9, the same reference numerals are employed. In the illustrated embodiment, blade 170 includes airfoil 202 and a tip 1704. Tip 1704 includes a first winglet 1750, which may be similar to winglet 250 (shown in FIGS. 2 and 3), winglet 450 (shown in FIGS. 4-6), and/or winglet 750 (shown in FIGS. 7-9). In addition, blade tip 1704 includes an integrated tip baffle 1760 extending chordally aft between leading edge 214 and trailing edge 216. Tip baffle 1760 is nested transversely between tip ribs 224, 226. In addition, tip baffle 1760 at least partially conforms to an aerodynamic profile of first tip rib 224 and at least partially conforms to an aerodynamic profile of second tip rib 226. Tip baffle 1760 divides forward section 218 of tip 1704 into two pockets, 1762 and 1764. In the illustrated embodiment, tip baffle 1760 is substantially co-planar with (or the same "height" as) tip ribs 224, 226. Tip baffle 1760 and corresponding pockets 1762, 1764 cooperate to extract of energy from leakage flow 240 (shown in FIGS. 2 and 5). More specifically, secondary flow vortices are developed in flow streamlines of leakage flow 240 within pockets 1762, 1764, reducing the ultimate vortex roll-up 242 on suction side 212 of blade 170.

Figure 18:
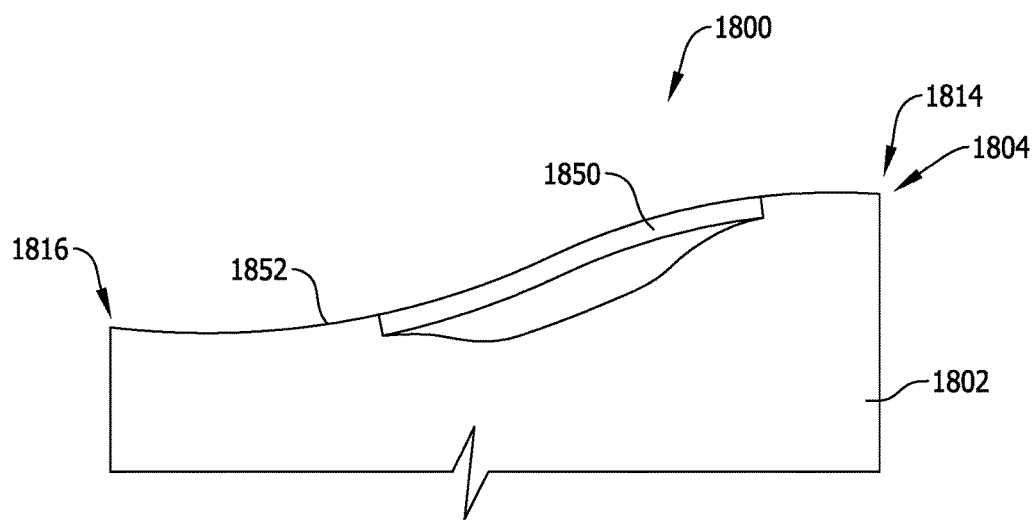
FIG. 18 is a side view of a first alternative turbine blade.

FIG. 18 is a side view of a first alternative turbine blade 1800. In the illustrated embodiment, turbine blade 1800 includes an airfoil 1802 and a generally conical tip 1804. More particularly, a leading edge 1814 of tip 1804 extends further radially outward than a trailing edge 1816 of tip 1804. In the illustrated embodiment, tip 1804 includes a winglet 1850 that is configured to conform to the curvature of tip 1804. Although winglet 1850 is illustrated as extending continuously from a tip top face 1852, it should be understood that, in alternative embodiments, winglet 850 may be located radially inward from tip top face 1852.

Figure 19:
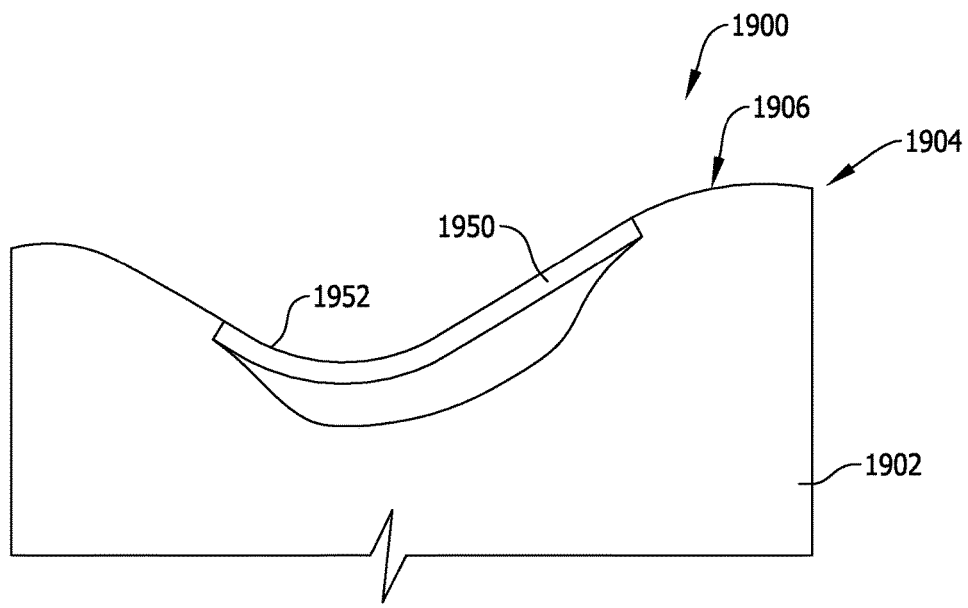
FIG. 19 is a side view of a second alternative turbine blade.

FIG. 19 is a side view of a second alternative turbine blade 1900. In the illustrated embodiment, turbine blade 1900 includes an airfoil 1902 and a tip 1904 with a complex curvature 1906. Although curvature 1906 is illustrated as a "saddle" shape, it should be understood that, in alternative embodiment, tip 1904 may have any complex curvature 1906 that varies radially and/or axially. In the illustrated embodiment, tip 1904 includes a winglet 1950 that is configured to conform to curvature 1906 of tip 1904. Although winglet 1950 is illustrated as extending continuously from a tip top face 1952, it should be understood that, in alternative embodiments, winglet 1950 may be located radially inward from tip top face 1952.

The above-described turbine blades provide a cost-effective method for increasing an efficiency and performance of turbines in turbofan engines. Specifically, providing the above-described winglets on the turbine blades drives an induced vortex away from the turbine blade, which reduces the vortex and thereby reduces pressure loss. The winglet may be provided on the suction side of the blade airfoil and may be positioned proximate a point of maximum thickness or high curvature of the blade. Moreover, the cooling aperture arrangements are configured to provide cooling to the added structure of the winglet on the blade tip.

Exemplary embodiments of turbine blades in high-pressure turbines are described above in detail. The turbine blades, and methods of operating such systems and devices, are not limited to the specific embodiments described herein, but rather, components of systems and/or steps of the methods may be utilized independently and separately from other components and/or steps described herein. For example, the methods and systems may also be in other engine assemblies or other, non-engine systems employing turbines, such as ground craft and/or energy-related applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine blade comprising:
   a blade root;
   a blade tip; and
   an airfoil extending between said blade root and said blade tip, said airfoil having opposite pressure and suction sides extending between a forward leading edge and an aft trailing edge of said airfoil, said airfoil having a maximum thickness located between said leading edge and said trailing edge,
   said blade tip including a first squealer tip rib that conforms to said pressure side and a second squealer tip rib that conforms to said suction side, the first and second squealer tip ribs being spaced-apart from one another and defining therebetween a tip cavity that includes a tip floor enclosing a radial end of the airfoil,
said blade tip comprising a winglet extending laterally outward from at least one of said pressure side and said suction side from a leading point between said leading edge and said maximum thickness aftward to a trailing point between said maximum thickness and said trailing edge, wherein said winglet includes a winglet top face, a winglet bottom face, and a winglet side face extending between the winglet top face and the winglet bottom face, further comprising a second winglet extending laterally from the other of the at least one of said pressure side and said suction side where the winglet and second winglet are spaced a first and second radial distance from the first squealer tip rib and second squealer tip rib respectively.

2. The turbine blade of claim 1, wherein said turbine blade is encased by a stationary shroud and said blade tip is spaced apart from the stationary shroud by a tip clearance gap.

3. The turbine blade of claim 1, wherein said winglet comprises a forward first portion extending aft from said leading point between said leading edge and said maximum thickness, said first portion comprises a convex forward edge.

4. The turbine blade of claim 3, wherein said winglet comprises an aft second portion extending aft from said first portion, said second portion comprises a concave aft edge.

5. The turbine blade of claim 1, wherein said winglet comprises a side face forming a compound curve over at least a portion of said side face of said winglet.

6. The turbine blade of claim 5, wherein said side face of said winglet is angled radially inwardly.

7. The turbine blade of claim 1, wherein said winglet extends laterally outward from at least one of said pressure side and said suction side, spaced a predetermined radial distance from said blade tip.

8. The turbine blade of claim 1, wherein said blade tip comprises a top face and said winglet comprises a top face continuous with said blade tip top face, said winglet extending laterally outward from said suction side.

9. The turbine blade of claim 1, wherein said blade tip further comprises a cooling aperture arrangement configured to channel cooling air to said winglet.

10. A method of providing a turbine blade, said method comprising:
providing a turbine blade extending radially outward from a blade root, the turbine blade including a blade tip formed at a distal end of the turbine blade and an airfoil extending between the blade root and the blade tip, wherein the airfoil has opposite pressure and suction sides extending between a forward leading edge and an aft trailing edge of the airfoil and a maximum thickness located between the leading edge and the trailing edge;
wherein said blade tip includes a first squealer tip rib that conforms to said pressure side and a second squealer tip rib that conforms to said suction side, the first and second squealer tip ribs being spaced-apart from one another and defining therebetween a tip cavity that includes a tip floor enclosing a radial end of the airfoil; and
providing a winglet coupled to the blade tip, the winglet extending laterally outward from at least one of the pressure side and the suction side from a leading point between the leading edge and the maximum thickness aftward to a trailing point between the maximum thickness and the trailing edge, wherein the winglet is configured to guide a flow of leakage air over the blade tip away from the airfoil, said guiding causing a vortex formed from the leakage air to compact, said guiding further reducing a pressure loss across the blade tip, wherein said winglet includes a winglet top face, a winglet bottom face, and a winglet side face extending between the winglet top face and the winglet bottom face, further comprising a second winglet extending laterally from the other of the at least one of said pressure side and said suction side where the winglet and second winglet are spaced a first and second radial distance from the first squealer tip rib and second squealer tip rib respectively.

11. The method of claim 10, further comprising angling a side face of the winglet radially inwardly, the side face forming a compound curve over at least a portion of the side face of the winglet.

12. The method of claim 10, further comprising spacing the winglet a predetermined radial distance from the blade tip.

13. The method of claim 10, further comprising aligning the winglet with a top face of the blade tip, said aligning positioning the winglet in a continuous configuration with respect to the top face of the blade tip.

14. The method of claim 10, further comprising positioning the leading point of the winglet at a vortex onset point of the blade tip.

15. The method of claim 10, further comprising providing a cooling aperture arrangement defined in the blade tip, the cooling aperture arrangement configured to channel cooling air to the winglet.

16. A turbofan engine comprising:
a core engine including a multistage compressor; and
a fan powered by a turbine driven by gas generated in said core engine,
said turbine comprising a turbine blade comprising:
a blade root;
a blade tip; and
an airfoil extending between said blade root and said blade tip, said airfoil having opposite pressure and suction sides extending between a forward leading edge and an aft trailing edge of said airfoil, said airfoil having a maximum thickness located between said leading edge and said trailing edge, said blade tip including a first squealer tip rib that conforms to said pressure side and a second squealer tip rib that conforms to said suction side, the first and second squealer tip ribs being spaced-apart from one another and defining therebetween a tip cavity that includes a tip floor enclosing a radial end of the airfoil, said blade tip comprising a winglet extending laterally outward from at least one of said pressure side and said suction side from a leading point between said leading edge and said maximum thickness aftward to a trailing point between said maximum thickness and said trailing edge, wherein said winglet includes a winglet top face, a winglet bottom face, and a winglet side face extending between the winglet top face and the winglet bottom face, further comprising a second winglet extending laterally from the other of the at least one of said pressure side and said suction side where the winglet and second winglet are spaced a first and second radial distance from the first squealer tip rib and second squealer tip rib respectively.

17. The turbofan engine of claim 16, wherein said turbine blade is encased by a stationary shroud.

18. The turbofan engine of claim 16, wherein said winglet comprises a forward first portion extending aft from said leading point between said leading edge and said maximum thickness, said first portion comprises a convex forward edge.

19. The turbofan engine of claim 17, wherein said winglet comprises an aft second portion extending aft from said first portion, said second portion comprises a concave aft edge.

20. The turbofan engine of claim 16, wherein said winglet comprises a side face forming a compound curve over at least a portion of said side face of said winglet.

21. The turbofan engine of claim 20, wherein said side face of said winglet is angled radially inwardly.

22. The turbofan engine of claim 16, wherein said winglet extends laterally outward from at least one of said pressure side and said suction side, spaced a predetermined radial distance from said blade tip.

23. The turbofan engine of claim 16, wherein said blade tip comprises a top face and said winglet comprises a top face continuous with said blade tip top face, said winglet extending laterally outward from said suction side.

24. The turbofan engine of claim 16, further comprising a stationary shroud surrounding said turbine, said stationary shroud and said blade tip defining a gap therebetween, wherein leakage air flows through the gap to form a vortex on said suction side of said airfoil, and wherein said winglet is configured to guide the vortex away from said airfoil to reduce pressure loss therefrom.

25. The turbofan engine of claim 16, wherein said blade tip further comprises a cooling aperture arrangement configured to channel cooling air to said winglet.

* * * * *